United States Patent
Winston et al.

(10) Patent No.: US 11,468,276 B2
(45) Date of Patent: Oct. 11, 2022

(54) SYSTEM AND METHOD OF A MONOTONE OPERATOR NEURAL NETWORK

(71) Applicant: Robert Bosch GmbH, Stuttgart (DE)

(72) Inventors: Ezra Winston, Pittsburgh, PA (US);
Jeremy Kolter, Pittsburgh, PA (US);
Anit Kumar Sahu, Pittsburgh, PA (US)

(73) Assignee: ROBERT BOSCH GMBH

( * ) Notice: Subject to any disclaimer, the term of this patent is extended or adjusted under 35 U.S.C. 154(b) by 357 days.

(21) Appl. No.: 16/850,816

(22) Filed: Apr. 16, 2020

(65) Prior Publication Data
US 2021/0326663 A1    Oct. 21, 2021

(51) Int. Cl.
G06N 3/08      (2006.01)
G06K 9/62      (2022.01)
G06N 20/10     (2019.01)
G06N 5/04      (2006.01)

(52) U.S. Cl.
CPC .......... *G06K 9/6277* (2013.01); *G06N 3/084* (2013.01); *G06N 5/046* (2013.01); *G06N 20/10* (2019.01)

(58) Field of Classification Search
CPC ..................................................... G06N 3/08
See application file for complete search history.

(56) References Cited

U.S. PATENT DOCUMENTS

| | | | | |
|---|---|---|---|---|
| 9,934,364 B1* | 4/2018 | Kumar | .................... | G16B 25/10 |
| 10,262,259 B2* | 4/2019 | Lin | .......................... | G06N 3/08 |
| 10,646,156 B1* | 5/2020 | Schnorr | ................. | G06N 3/088 |
| 2019/0267113 A1* | 8/2019 | Okanohara | ............ | G16B 40/00 |
| 2019/0354842 A1* | 11/2019 | Louizos | ............... | G06N 3/0454 |
| 2020/0159916 A1* | 5/2020 | Nguyen | ............... | G06K 9/6267 |
| 2020/0167914 A1* | 5/2020 | Stamatoyannopoulos | ................... G06T 7/0012 | |
| 2020/0218982 A1* | 7/2020 | Annau | .................... | G06N 20/00 |
| 2020/0264876 A1* | 8/2020 | Lo | ......................... | G06K 9/6262 |
| 2020/0272900 A1* | 8/2020 | Khomami Abadi | ..... | G06N 3/08 |
| 2020/0372626 A1* | 11/2020 | Dal Mutto | ............. | G06N 3/084 |
| 2021/0112226 A1* | 4/2021 | Abou Shousha | ...... | A61B 3/145 |
| 2022/0012564 A1* | 1/2022 | Zjajo | ...................... | G06N 3/063 |

OTHER PUBLICATIONS

Bai et al., "Deep Equilibrium Models", 33rd Conference on Neural Information Processing Systems (NeurIPS 2019), Vancouver, Canada, 16 pages.
Bai et al., "Trellis Networks for Sequene Modeling", https://github.com/locuslab/trellisnet, Published as a conference paper at ICLR 2019, 18 pages.
Chen et al., "Neural Ordinary Differential Equations", 32nd Conference on Neural Information Processing Systems (NeurIPS 2018), Montreal, Canada, 18 pages.

\* cited by examiner

*Primary Examiner* — Cindy Trandai
(74) *Attorney, Agent, or Firm* — Dickinson Wright PLLC

(57) ABSTRACT

A system for training a neural work that includes an input interface for accessing input data for the neural network and a processor in communication with the input interface. The processor is programmed to receive input at the neural network and output a trained neural networking utilizing a forward prorogation and a backward propagation, wherein the forward propagation includes utilizing a root-finding procedure to identify a fixed point associated with one or more parameters of the neural network, wherein the backward propagation includes identifying a derivative of a loss associated with the parameters of the network.

20 Claims, 7 Drawing Sheets

SYSTEM AND METHOD OF A MONOTONE OPERATOR NEURAL NETWORK

TECHNICAL FIELD

The present disclosure relates to computer systems that have capability for artificial intelligence, including neural networks.

BACKGROUND

The general goal of a DEQ (Deep Equilibrium) model may be to define some forward function $f$ such that the forward pass of the network is given by first solving for an equilibrium point $z^*=f(z^*, x; \theta)$. The backward pass may correspond largely to multiplying by the Jacobian $$\frac{\partial z^*}{\partial \theta},$$

which in its exact form requires the solution of a linear systems. There are three primary challenges in developing a DEQ model. One may be defining $f$ such that the fixed point $z^*$ exists and ideally is unique. The second may be defining a root-finding procedure that can find the fixed point $z^*$ in the forward pass. The third may be defining a back pass to solve the multiplication by the Jacobian $$\frac{\partial z^*}{\partial \theta}.$$

SUMMARY

According to one embodiment, a computer-implemented method for predicting a classification and training a neural work includes receiving input at the neural network, classifying the input of the neural networking utilizing a forward propagation, wherein the forward propagation includes utilizing a root-finding procedure to identify a fixed point associated with one or more parameters of the neural network, computing a vector by utilizing a linear transformation of the fixed point, outputting the classification of the input in response to a maximum element of the vector, and training the neural networking utilizing a backward propagation, wherein the backward propagation includes identifying a derivative of a loss associated with the parameters of the network.

According to a second embodiment, a computer-implemented method for a classification of input to a neural network, comprising receive input at the neural network, identify a classification of the input at the neural networking utilizing a forward propagation, wherein the forward propagation includes utilizing a root-finding procedure to identify a fixed point associated with a parameter of the neural network, compute a vector by utilizing a linear transformation of the fixed point, and output the classification of the input in response to a maximum element of the vector.

According to a third embodiment, a system for training a neural work includes an input interface for accessing input data for the neural network and a processor in communication with the input interface. The processor is programmed to receive input at the neural network and output a trained neural networking utilizing a forward prorogation and a backward propagation, wherein the forward propagation includes utilizing a root-finding procedure to identify a fixed point associated with one or more parameters of the neural network, wherein the backward propagation includes identifying a derivative of a loss associated with the parameters of the network.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In the previous DEQ models, defining a function with a fixed point may be done heuristically by using network structures that empirically seem to produce stable fixed points. This may include using existing transformer-style architectures, or existing convolutional architectures, with appropriate layer normalization to attempt to provide a stable system. However, such layers come with no formal guarantees for the existence of a fixed point. For root finding procedure, the DEQ may use a nonlinear Broyden method, which is also not guaranteed to find a root (even if a root or fixed point exists). Additionally, the backward pass may use a similar Broyden method for a linear solve, which may be guaranteed to multiply by the appropriate inverse if it exists, but the Jacobian will not correspond to a meaningful derivative if the fixed point does not exist or if the forward pass fails to converge.

The monotone operator network may be a specific form of DEQ model that provides much better solutions to the three challenges identified above. Specifically, for defining a function with a fixed point, the monotone operator network uses a particular parameterized form of the function $f$ that may guarantee existence and uniqueness of a fixed point. By applying the tools of monotone operator theory, the system can derive two different iterative procedures that find the equilibrium point of the system. Those procedures may always be guaranteed to converge to the equilibrium point. The system can formulate a similar set of algorithms to perform the backward pass.

Figure 1:
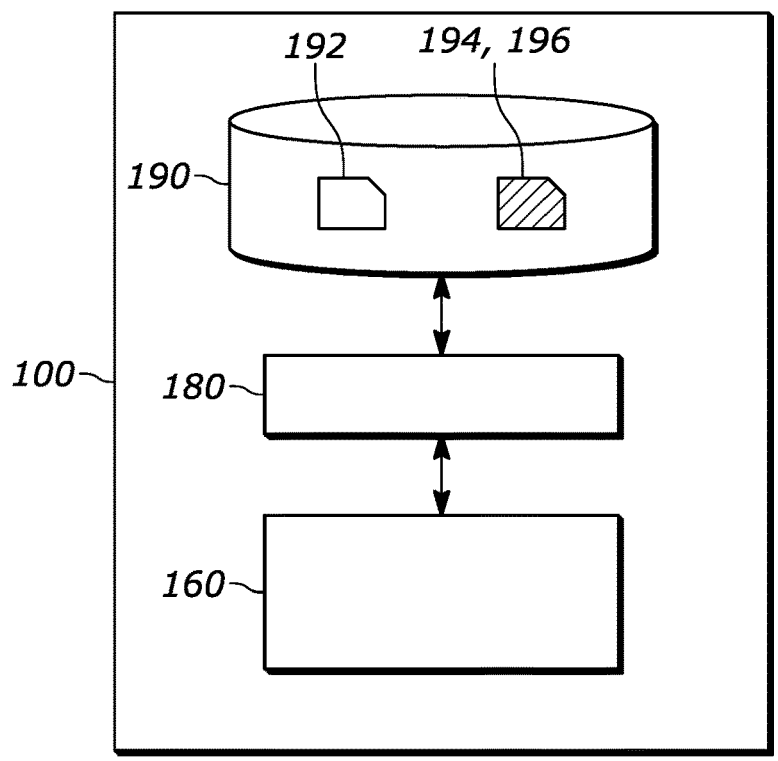
FIG. 1 shows a system 100 for training a neural network.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, 30 e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage 5 interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ('IO') interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
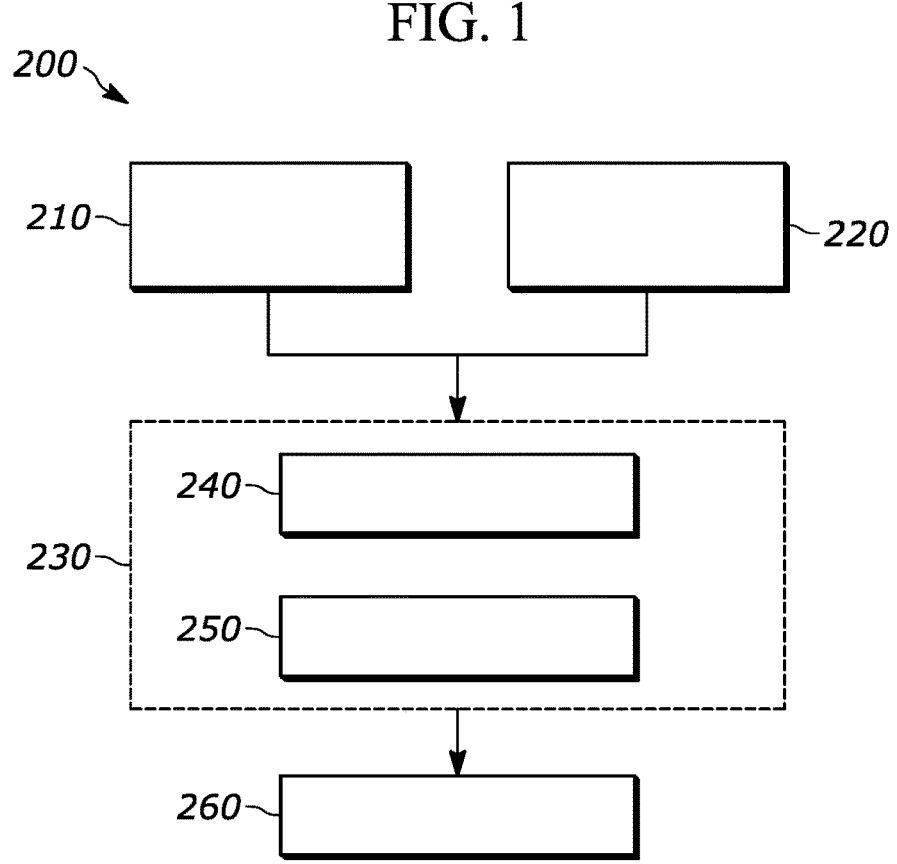
FIG. 2 shows a computer-implemented method 200 for training a neural network.

FIG. 2 shows a computer-implemented method 200 for training a neural network. The method 200 may correspond to an operation of the system 100 of FIG. 1, but does not need to, in that it may also correspond to an operation of another type of system, apparatus or device or in that it may correspond to a computer program.

The method 200 is shown to comprise, in a step titled "PROVIDING DATA REPRESENTATION OF NEURAL NETWORK", providing 210 a neural network, wherein the providing of the neural network comprises providing an iterative function as a substitute for a stack of layers of the neural network, wherein respective layers of the stack of layers being substituted have mutually shared weights and receive as input an output of a previous layer, or for a first layer of the stack of layers, an initial activation, and a part of the input of the stack of layers. The method 200 is further shown to comprise, in a step titled "ACCESSING TRAINING DATA", accessing 220 training data for the neural network. The method 200 is further shown to comprise, in a step titled "ITERATIVELY TRAINING NEURAL NETWORK USING TRAINING DATA", iteratively 230 training the neural network using the training data, which training 230 may comprise a forward propagation part and a backward propagation part. Performing the forward propagation part by the method 200 may comprise, in a step titled "DETERMINING EQUILIBRIUM POINT USING ROOT-FINDING ALGORITHM", determining 240 an equilibrium point of the iterative function at which the iterative function converges to a fixed point, wherein determining the equilibrium point comprises using a numerical root-finding algorithm to find a root solution for the iterative function minus its input, and in a step titled "PROVIDING EQUILIBRIUM POINT AS SUBSTITUTE FOR OUTPUT OF STACK OF LAYERS", providing the equilibrium point as a substitute for an output of the stack of layers in the neural network. The method 200 may further comprise, after the training and in a step titled "OUTPUTTING TRAINED NEURAL NETWORK", outputting 260 a trained neural network. The following examples describe the neural network, including the training thereof in which a stack of layers is substituted by an iterative function and in which a root finding algorithm is used to determine an equilibrium point at which the iterative function converges to a fixed point, wherein determining the equilibrium point comprises using a numerical root-finding algorithm to find a root solution for the iterative function minus its input, and in a step titled "PROVIDING EQUILIBRIUM POINT AS A SUBSTITUTE FOR OUTPUT OF STACK OF LAYERS", providing 250 the equilibrium point as a substitute for an output of the stack of layers in the neural network. The method 200 may further comprise, after the training and in a step titled "OUTPUTTING TRAINED NEURAL NETWORK," outputting 260 a trained neural network. The neural network may be further described in the patent application titled "DEEP NEURAL NETWORK WITH EQUILIBRIUM SOLVER," having application Ser. No. 16/985,582, filed Aug. 5, 2020, which is herein incorporated by reference in its entirety.

Figure 3:
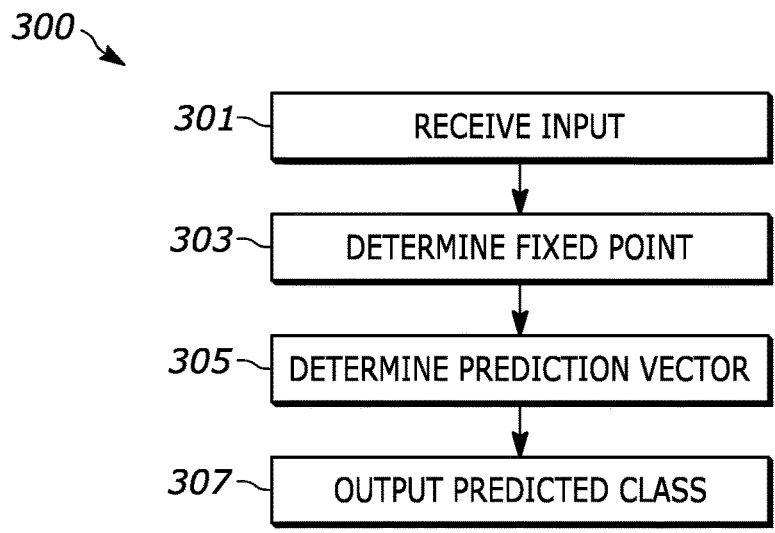
FIG. 3 depicts a flow chart 300 of a classification process of a monotone network.

FIG. 3 depicts a flow chart 300 of a classification process of a monotone network. At step 301, the system may receive input from an input interface. The input interface may be a wireless communication (e.g., Wi-Fi, 4G, 5G, LTE, etc) or wired communication (USB, Serial, CAN-BUS, etc.). The input interface may allow the network to communicate with various sensors, such as a camera, radar, Lidar, etc. The input may be any input data, including but not limited to image data. The input may, for example, include the pixel values of an image.

At step 303, the network may compute a fixed point (e.g., equilibrium point) via forward propagation. In the monotone operator network, the network may utilize a specific form of the equilibrium function, specifically the parameterization:

$$z^* = \sigma(Wz^* + Ux + b)$$

Where $\sigma$ may be some nonlinear function and, which may be in a particular embodiment the proximal operator of a convex function (effectively, this may mean that $\sigma$ is monotonic increasing with a Lipschitz constant less than or equal to one, e.g., it is non-expansive); W and U may be linear operators such as a matrix multiplication or multi-layer convolution, and b is a constant. A key aspect to the monotone operator network is that W is of a specific form, namely $$W = (1-m)I - A^T A + B - B^T$$

where A and B are also linear operators such as matrix multiplications or convolutions, and m>0 is a positive constant selected to be m=0.1 by default. In this example, the parameters that define the network are $\theta = \{A, B, U, b\}$. This parameterization may guarantee that there is a unique fixed point (e.g., equilibrium point) satisfying the conditions $z^* = \sigma(Wz^* + Ux + b)$.

Using such parameterization, the system can use two different approaches to compute the equilibrium point $z^* = \sigma(Wz^* + Ux + b)$. The network may utilize a root-finding procedure to determine the fixed point. The first approach may be the Forward-Backward (FB) splitting method. The second approach may be a Peaceman-Rachford (PR) splitting method. The realization of these methods for the monotone operator network is as follows:

Algorithm: FB-ForwardSolve (e.g., FB splitting method)
Initialize z:=0
Repeat until convergence:

$$z := \sigma((1-\alpha)z + \alpha(Wz + Ux + b))$$

Return z
Algorithm: PR-ForwardSolve (e.g., Peacean-Rachford splitting method)
Initialize u:=0, z:=0
Repeat until convergence:

$$u_{1/2} := 2z - u$$

$$z_{1/2} := ((1+\alpha)I - \alpha W)^{-1}(u_{1/2} - \alpha(Ux + b))$$

$$u := 2z_{1/2} - u$$

$$z := \sigma(u)$$

Return z

For both algorithms or methods, $\alpha$ may be a free parameter analogous to a step size in gradient-based optimization methods. The free parameter can be tuned to improve convergence speed given a particular network. For the PR-ForwardSolve algorithm, the system may typically set $\alpha = 1$, whereas for the FB-ForwardSolve algorithm there may not be a single value that works best in general, and the parameter may be tuned for a specific network.

The PR-ForwardSolve may require that the system be able to multiply by the inverse $((1+\alpha)I - \alpha W)^{-1}$. In the case that the A and B operators that define W are dense matrices, this can be accomplished via direct inversion of the matrix. However, in the event that A and B are convolutions, the system may compute the necessary inverse using a fast Fourier transform.

At step 305, the neural network may compute a prediction vector. The network may perform certain mathematical operations to obtain the prediction vector. These operations may be performed in hidden layers (e.g., between the input layer and output layer) of the neural network. The prediction vector may be computed by taking the equilibrium point and applying another linear operation. The prediction vector may be calculated as:

$$\hat{y} = W_y z^* + b_y$$

The prediction vector may be a function of the weights of the neural network.

At step 307, the system may output a predicted classification. The predicted classification of the input may be an index of a max value of $\hat{y}$. The class prediction may be the largest element of y. In an example when the third entry of y is the largest, the system may predict that the classification is that of class. The classification step may classify the input data. In one example, the input data may be an image, and based on the classification, the neural network may classify the image as that of a vehicle or pedestrian. The classification of the input data may also be utilized to train the neural network, as explained further below.

Figure 4:
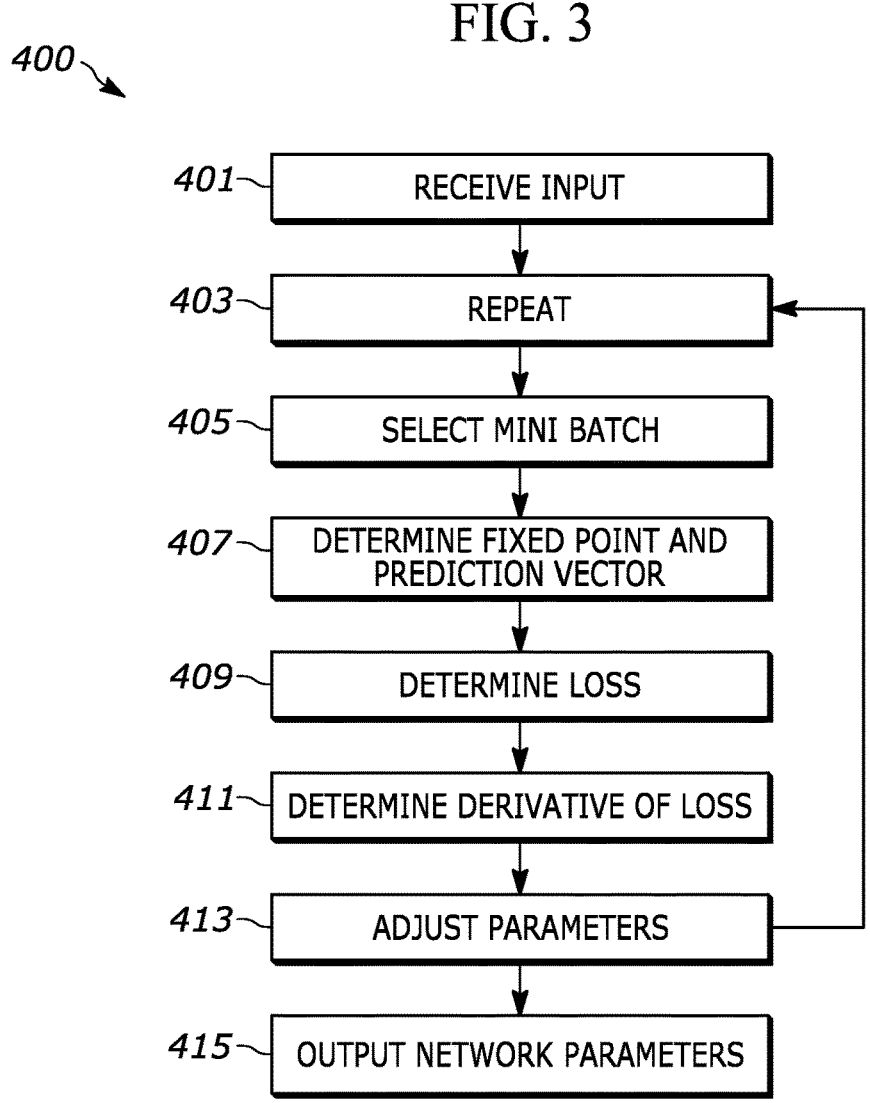
FIG. 4 depicts a flow chart 400 of a training process of a monotone network.

FIG. 4 depicts a flow chart 400 of a training process of a monotone network. At step 401, the network may receive an input that includes a corresponding classification of the input data. The input may be defined as:

$$\text{Input: } (x_i, y_i) i = 1, \ldots, n$$

In the formula above, $x_i$ may define the input while $y_i$ may define the true class, and i may be an index over the different examples in the training set.

At step 403, the network may determine whether a repetition of is required for the prediction. The system may stop repeating when a parameter of values convergence, or when the loss stops decreasing. If either scenario occurs, the system may stop repeating each of the steps in the training process.

At step 405, the network may select a subset of the full training data, referred to as a minibatch B.

At step 407, the network may run a forward pass to compute $z^*_i$ and $\hat{y}_i$. The network may run a forward pass computation to output a classification of each index of a minibatch. Thus, the steps of FIG. 3 may be performed for each index of the minibatch.

At step 409, the system may compute a loss. The loss may be computed utilizing cross-entropy loss. The loss may be computed via the equation:

$$l = \Sigma_{i \in B}(\hat{y}_i)_y + \log \Sigma_j \exp((\hat{y}_i)_j)$$

The cross-entropy loss may measure the performance of a classification model who's output is a probability value between two values (e.g., between 0 and 1). The cross-entropy loss may increase as the predicted probability diverges from the actual label. A perfect model would have a loss of zero, for example.

At step 411, the system may computer the derivates of the loss with respect to the network parameters. The computation of the backward pass may require that the system may compute the derivative of the loss with respect to the network parameters. That is, the system may need to compute:

$$\frac{\partial \ell}{\partial \theta} = \frac{\partial \ell}{\partial z^*} \frac{\partial z^*}{\partial \theta}$$

For example, the system may need to left-multiply to $$\frac{\partial z^*}{\partial \theta}$$

(the remaining term $$\frac{\partial \ell}{\partial z^*}$$

is easily computed by existing automatic differentiation tools). In the monotone operator framework, there are analogous methods for performing this multiplication as for the forward pass. Specifically, given $$\frac{\partial \ell}{\partial z^*}$$

the following two algorithms below may produce the necessary product. The realization of these methods for the monotone operator network may be as follows:

Algorithm: FB-ForwardSolve (e.g., FB splitting method)
Initialize u:=0
Let d=(1−σ'(Wz*+Ux+b))/σ'(Wz*+Ux+b) where σ' denote the derivative of σ (where we define $d_i=\infty$ if σ'(Wz*+Ux+b)=0)
Repeat:

$$v := (1-\alpha)u + \alpha W^T u$$

$$u_i := \frac{v_i + \alpha \frac{\partial \ell}{\partial z^*}}{1 + \alpha + \alpha d_i}$$

for all i (where the assignment is $u_i:=0$ if $d_i=\infty$)
Return $$\frac{\partial \ell}{\partial \theta} = \frac{\partial \sigma(Wz^* + Ux + b)^T}{\partial \theta}$$

$W^T u$ (where multiplication by $$\frac{\partial \sigma(Wz^* + Ux + b)^T}{\partial \theta}$$

is performed by a standard automatic differentiation toolkit).

Another Algorithm: PR-BackwardSolve (e.g., Peacean-Rachford splitting method)
Initialize u:=0, v:=0
Let d=(1−σ'(Wz*+Ux+b))/σ'(Wz*+Ux+b) where σ' denote the derivative of σ (where we define $d_i=\infty$ if σ'(Wz*+Ux+b)=0)
Repeat:

$$v_{1/2} := 2u - v$$

$$u_{1/2} := ((1+\alpha)I - \alpha W^T)^{-1} v_{1/2}$$

$$v := 2u_{1/2} - v$$

$$u_i := \frac{v_i + \alpha \frac{\partial \ell}{\partial z^*}}{1 + \alpha + \alpha d_i}$$

for all i (where the assignment is $u_i:=0$ if $d_i=\infty$)
Return $$\frac{\partial \ell}{\partial \theta} = \frac{\partial \sigma(Wz^* + Ux + b)^T}{\partial \theta}$$

$W^T u$ (where multiplication by $$\frac{\partial \sigma(Wz^* + Ux + b)^T}{\partial \theta}$$

is performed by a standard automatic differentiation toolkit).

As before, α may be a hyperparamter that can be set to α=1 for the PR variant, and needs to be tuned to specific architectures to minimize the number of needed iterations for the FB variants. These algorithms are guaranteed to converge to the unique solution of the backward pass. Again, for cases where W is a structured convolutional operator, the necessary inverses can be performed using the fast Fourier transform.

At step 413, the system may adjust their parameters using their gradient. The gradient may be defined as:

$$W = w - \alpha \frac{\partial \ell}{\partial w}$$

At step 415, the system may output final network parameters. The final network parameters may include W, u, b, $W_y$, $b_y$, etc. The parameters may be the various weights of matrices if the network is fully connected, or may be weights of a convolutional networks for a convolutional network.

Figure 5:
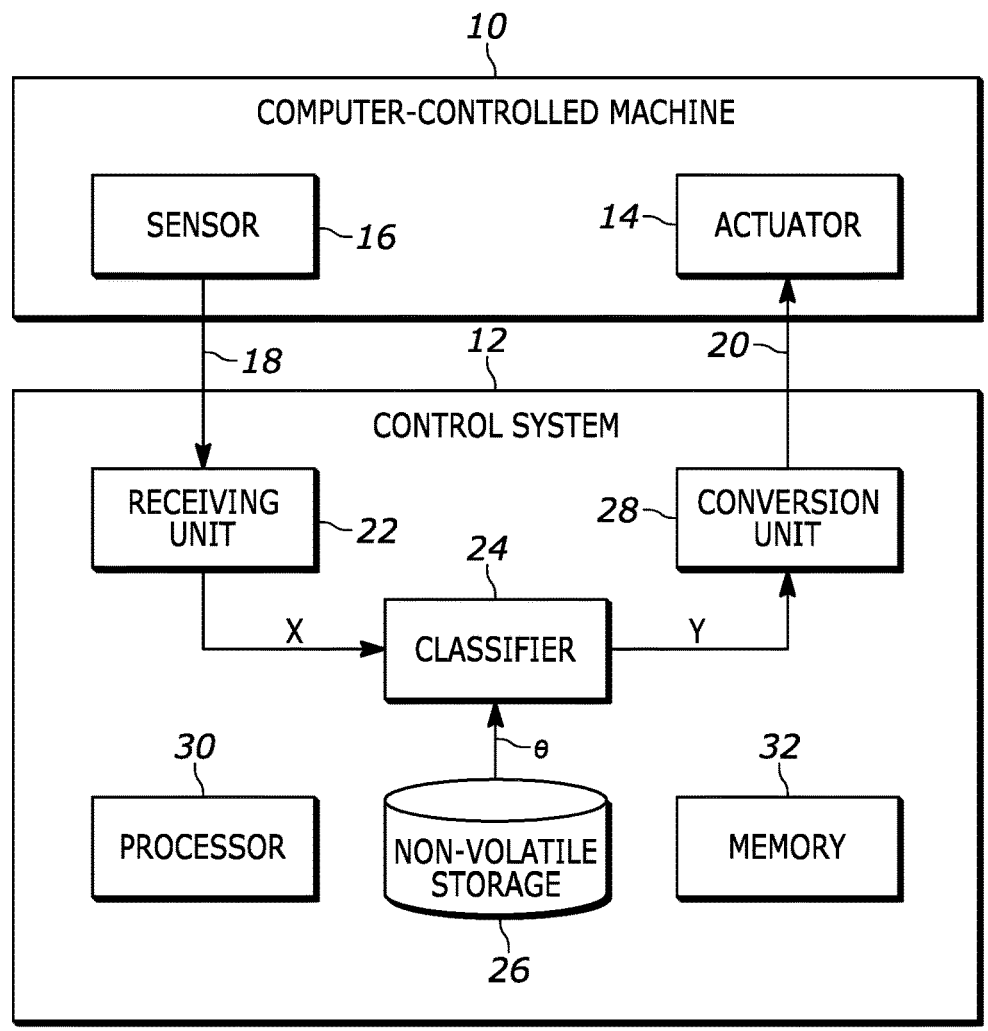
FIG. 5 depicts a schematic diagram of an interaction between computer-controlled machine 10 and control system 12.

FIG. 5 depicts a schematic diagram of an interaction between computer-controlled machine 10 and control system 12. Computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 30 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter θ). Parameters θ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 10.

As shown in FIG. 5, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
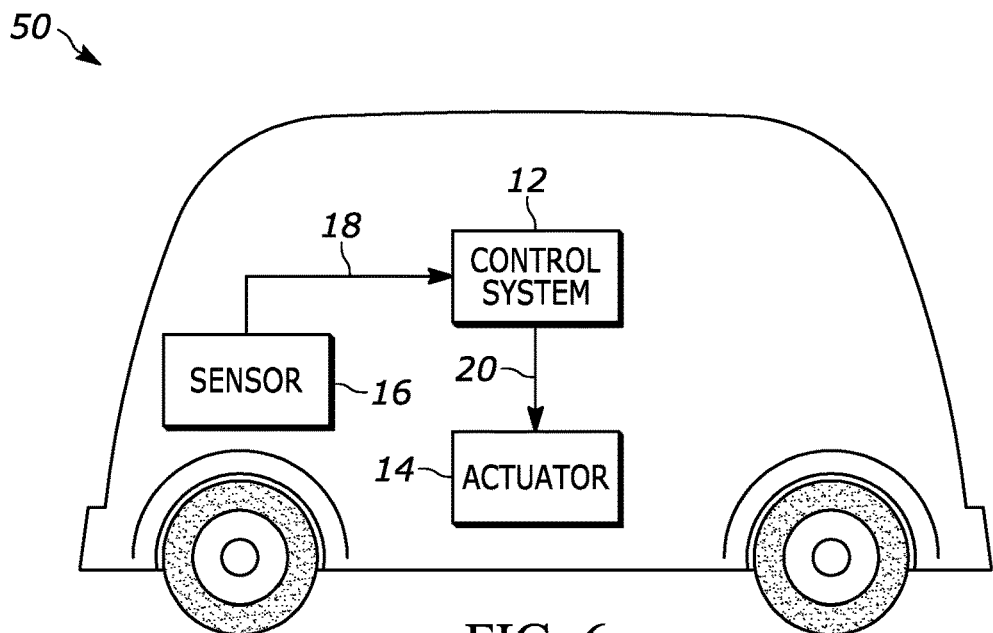
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
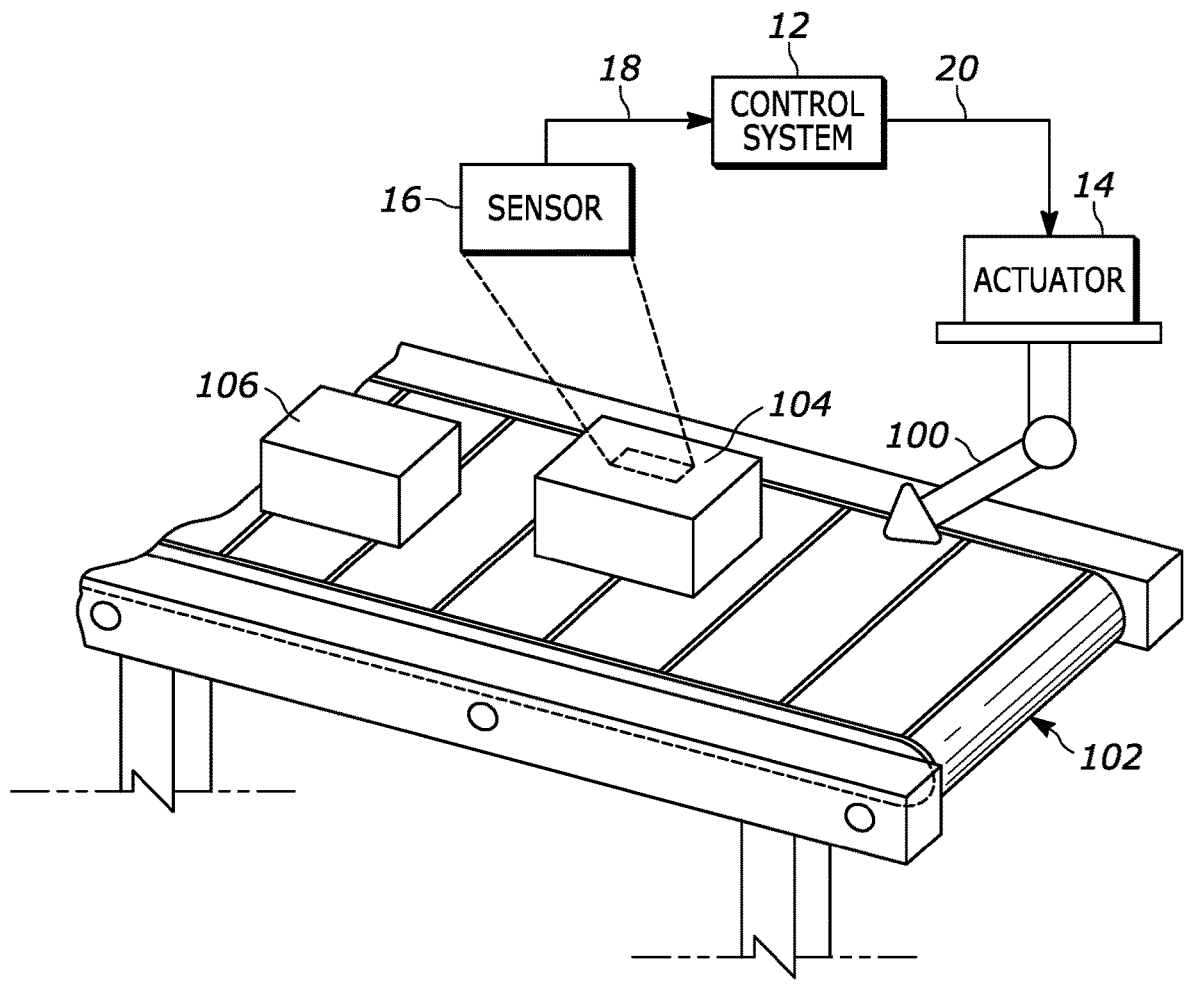
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control manufacturing machine 100, such as a punch cutter, a cutter or a gun drill, of manufacturing system 102, such as part of a production line. Control system 12 may be configured to control actuator 14, which is configured to control manufacturing machine 100.

Sensor 16 of manufacturing machine 100 may be an optical sensor configured to capture one or more properties of manufactured product 104. Classifier 24 may be configured to determine a state of manufactured product 104 from one or more of the captured properties. Actuator 14 may be configured to control manufacturing machine 100 depending on the determined state of manufactured product 104 for a subsequent manufacturing step of manufactured product 104. The actuator 14 may be configured to control functions of manufacturing machine 100 on subsequent manufactured product 106 of manufacturing machine 100 depending on the determined state of manufactured product 104.

Figure 8:
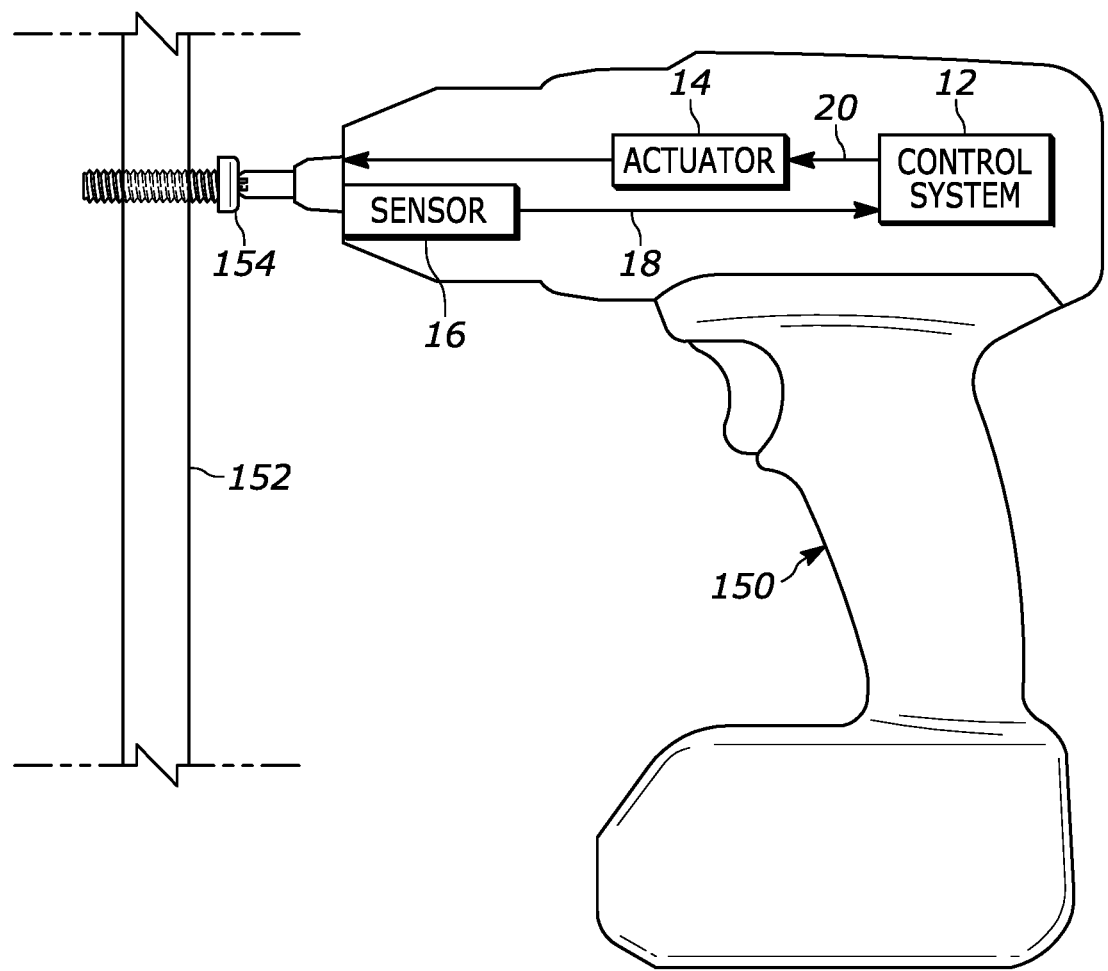
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 154. Actuator 14 may be configured to control power tool 150 such that the driving function of power tool 150 is adjusted depending on the determined state of fastener 154 relative to work surface 152 or one or more captured properties of work surface 154. For example, actuator 14 may discontinue the driving function if the state of fastener 154 is flush relative to work surface 152. As another non-limiting example, actuator 14 may apply additional or less torque depending on the hardness of work surface 152.

Figure 9:
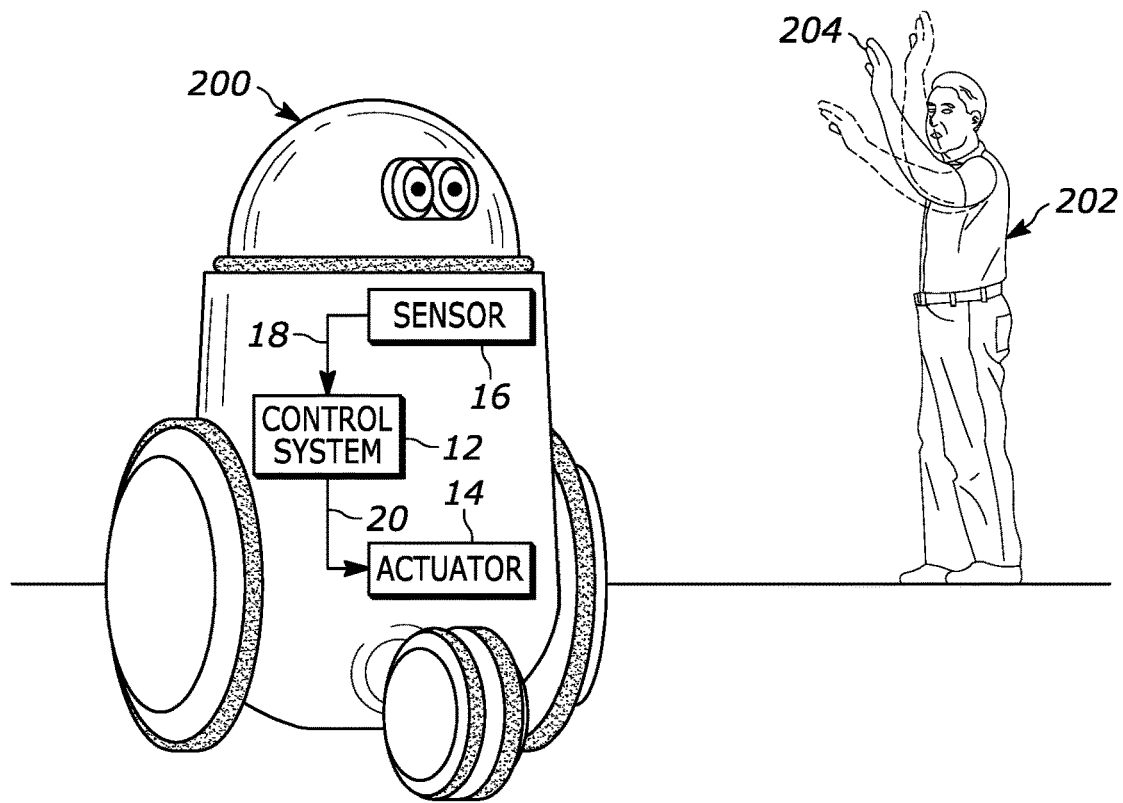
FIG. 9 depicts a schematic diagram of the control system of FIG. 1 configured to control an automated personal assistant.

FIG. 9 depicts a schematic diagram of control system 12 configured to control automated personal assistant 200. Control system 12 may be configured to control actuator 14, which is configured to control automated personal assistant 200. Automated personal assistant 200 may be configured to control a domestic appliance, such as a washing machine, a stove, an oven, a microwave or a dishwasher.

Sensor 16 may be an optical sensor and/or an audio sensor. The optical sensor may be configured to receive video images of gestures 204 of user 202. The audio sensor may be configured to receive a voice command of user 202.

Control system 12 of automated personal assistant 200 may be configured to determine actuator control commands 20 configured to control system 12. Control system 12 may be configured to determine actuator control commands 20 in accordance with sensor signals 18 of sensor 16. Automated personal assistant 200 is configured to transmit sensor signals 18 to control system 12. Classifier 24 of control system 12 may be configured to execute a gesture recognition algorithm to identify gesture 204 made by user 202, to determine actuator control commands 20, and to transmit the actuator control commands 20 to actuator 14. Classifier 24 may be configured to retrieve information from non-volatile storage in response to gesture 204 and to output the retrieved information in a form suitable for reception by user 202.

Figure 10:
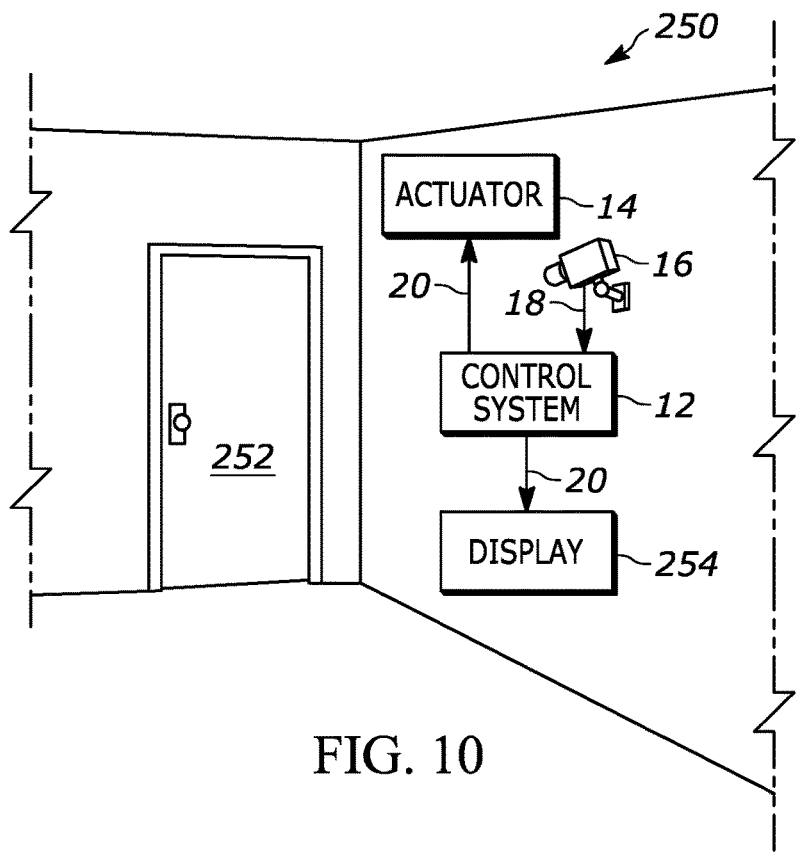
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 12 may be configured to generate and an actuator control command 20 in response to the interpretation of the image and/or video data. Control system 12 is configured to transmit the actuator control command 20 to actuator 12. In this embodiment, actuator 12 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 11:
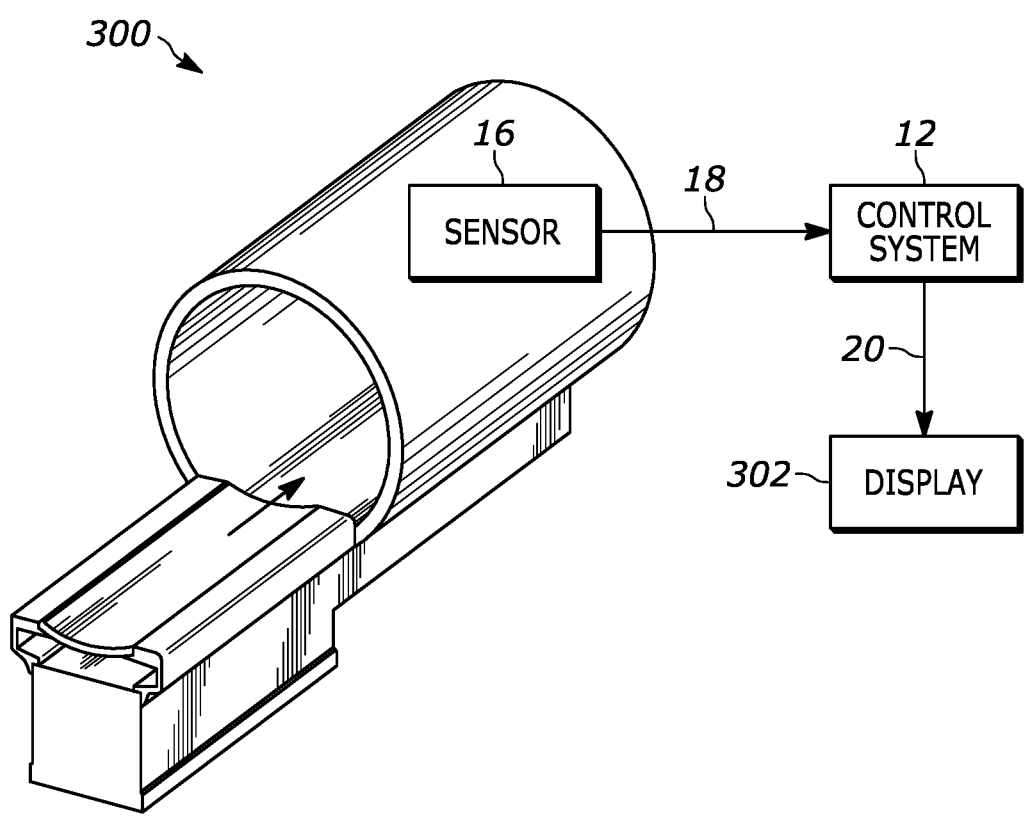
FIG. 11 depicts a schematic diagram of the control system of FIG. 1 configured to control an imaging system, for example an MM apparatus, x-ray imaging apparatus or ultrasonic apparatus.

FIG. 11 depicts a schematic diagram of control system 12 configured to control imaging system 300, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for predicting a classification and training a neural network, comprising:
   receiving input at the neural network;
   classifying the input of the neural networking utilizing a forward propagation, wherein the forward propagation includes utilizing a root-finding procedure to identify a fixed point associated with one or more parameters of the neural network;
   computing a vector by utilizing a linear transformation of the fixed point;
   outputting the classification of the input in response to a maximum element of the vector; and
   training the neural network utilizing a backward propagation, wherein the backward propagation includes identifying a derivative of a loss associated with the parameters of the neural network.

2. The computer-implemented method of claim 1, wherein performing backwards propagation includes utilizing a Forward-Backward splitting method.

3. The computer-implemented method of claim 1, wherein performing backwards propagation includes utilizing a Peaceman-Rachford splitting method.

4. The computer-implemented method of claim 1, wherein the input includes image data.

5. The computer-implement method of claim 1, wherein the forward propagation includes utilizing a Forward-Backward splitting method to identify the fixed point.

6. The computer-implement method of claim 1, wherein the forward propagation includes utilizing the forward propagation until a convergence.

7. The computer-implemented method of claim 1, wherein the forward propagation includes utilizing a Peaceman-Rachford splitting method to identify the fixed point.

8. The computer-implemented method of claim 1, wherein the backward propagation includes multiplying a Jacobian of a partial derivative of the fixed point of a nonlinear function.

9. The computer-implemented method of claim 1, wherein the backward propagation includes utilization of a hyperparameter.

10. A computer-implemented method for a classification of input to a neural network, comprising:
receiving input at the neural network;
identifying a classification of the input at the neural networking utilizing a forward propagation, wherein the forward propagation includes utilizing a root-finding procedure to identify a fixed point associated with a parameter of the neural network;
computing a prediction vector by utilizing a linear transformation of the fixed point; and
outputting the classification of the input in response to a maximum value of the prediction vector.

11. The computer-implemented method of claim 10, wherein performing the forward propagation includes utilizing a Forward-Backward splitting method.

12. The computer-implemented method of claim 10, wherein performing the forward propagation includes utilizing a Peaceman-Rachford splitting method.

13. The computer-implemented method of claim 10, wherein the input at the neural network includes image data received from one or more cameras.

14. The computer-implemented method of claim 10, wherein the fixed point is identified utilizing a non-linear function.

15. A system for training a neural network, comprising:
an input interface for accessing input data for the neural network; and
a processor in communication with the input interface, the processor programmed to:
receive the input data at the neural network; and
output a trained neural network utilizing a forward propagation and a backward propagation, wherein the forward propagation includes utilizing a root-finding procedure to identify a fixed point associated with one or more parameters of the neural network, wherein the backward propagation includes identifying a derivative of a loss associated with the parameters of the network.

16. The system of claim 15, wherein performing the backward propagation includes utilizing a Forward-Backward splitting method.

17. The system of claim 15, wherein performing the backward propagation includes utilizing a Peaceman-Rachford splitting method.

18. The system of claim 15, wherein the processor is further programmed to adjust the parameters of the neural network utilizing a gradient associated with the parameters.

19. The system of claim 15, wherein the processor is further programmed to run the forward propagation for each minibatch in response to an index.

20. The system of claim 15, wherein the neural network is a convolutional neural network.

* * * * *